United States Patent [19]

Naumann

[11] 4,054,017
[45] Oct. 18, 1977

[54] APPARATUS FOR PRODUCTION OF A BOTTLE-SHAPED CONTAINER, FILLED, SEALED AND READY FOR SHIPMENT

[75] Inventor: Wilhelm Naumann, Ettlingen, Germany

[73] Assignee: PMD Entwicklungswerk fur Kunststoff-maschinen GmbH & Co. KG., Ettlingen, Germany

[21] Appl. No.: 572,334

[22] Filed: Apr. 28, 1975

Related U.S. Application Data

[62] Division of Ser. No. 409,714, Oct. 25, 1973, Pat. No. 3,911,071.

[30] Foreign Application Priority Data

Nov. 20, 1972 Germany .......................... 2256884

[51] Int. Cl.² ........................................ B29D 23/03
[52] U.S. Cl. ...................... 53/112 A; 425/524; 425/522
[58] Field of Search ............ 425/136, 137, 138, 207, 425/DIG. 247, DIG. 207, 326 B, 387 B, DIG. 214, DIG. 215; 264/89, 96, 98, 296, DIG. 207, DIG. 215, 90, 92, 94, 96, 97, 99; 53/140, 193, 112 A; 277/235 B

[56] References Cited

U.S. PATENT DOCUMENTS

| 3,325,860 | 6/1967 | Hansen ............... 425/DIG. 207 |
| 3,597,516 | 8/1971 | Harwood ........................ 264/96 |
| 3,690,803 | 9/1972 | Pechtold et al. ............ 425/387 B |
| 3,717,430 | 2/1973 | Hansen ..................... 425/326 B |

FOREIGN PATENT DOCUMENTS

1,338,443  8/1963  France ......................... 264/98

Primary Examiner—Richard B. Lazarus
Attorney, Agent, or Firm—Montague & Ross

[57] ABSTRACT

An apparatus for producing a bottle-shaped container, filled, sealed and ready for shipment, which comprises the steps of inserting a section of a thermoplastic synthetic tube into a divided blow mold with individually adjustable crown mold halves. The bottom part of the tube is then closed. Blow-molding, filling and sealing steps of the tube are performed in the mold in its still locked state to form the container. The crown mold halves are thereafter closed airtight at the head end by joining together after insertion of a tube section to be widened into the blow mold by applying a pressure medium. At least a section of the wall of the container is subjected by engagement to an outer pressure and pressed in the wall into the inner space of the container. By the excess pressure developed thereby in the inner space of the container, the wall of the head of the container is pressed against the wall of the mold of crown mold halves.

2 Claims, 6 Drawing Figures

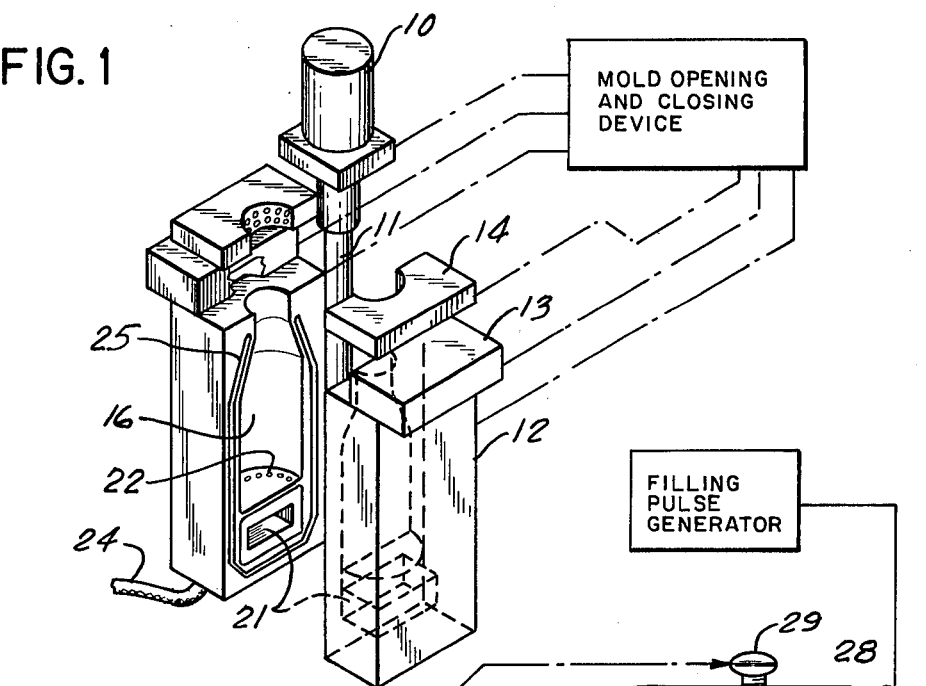
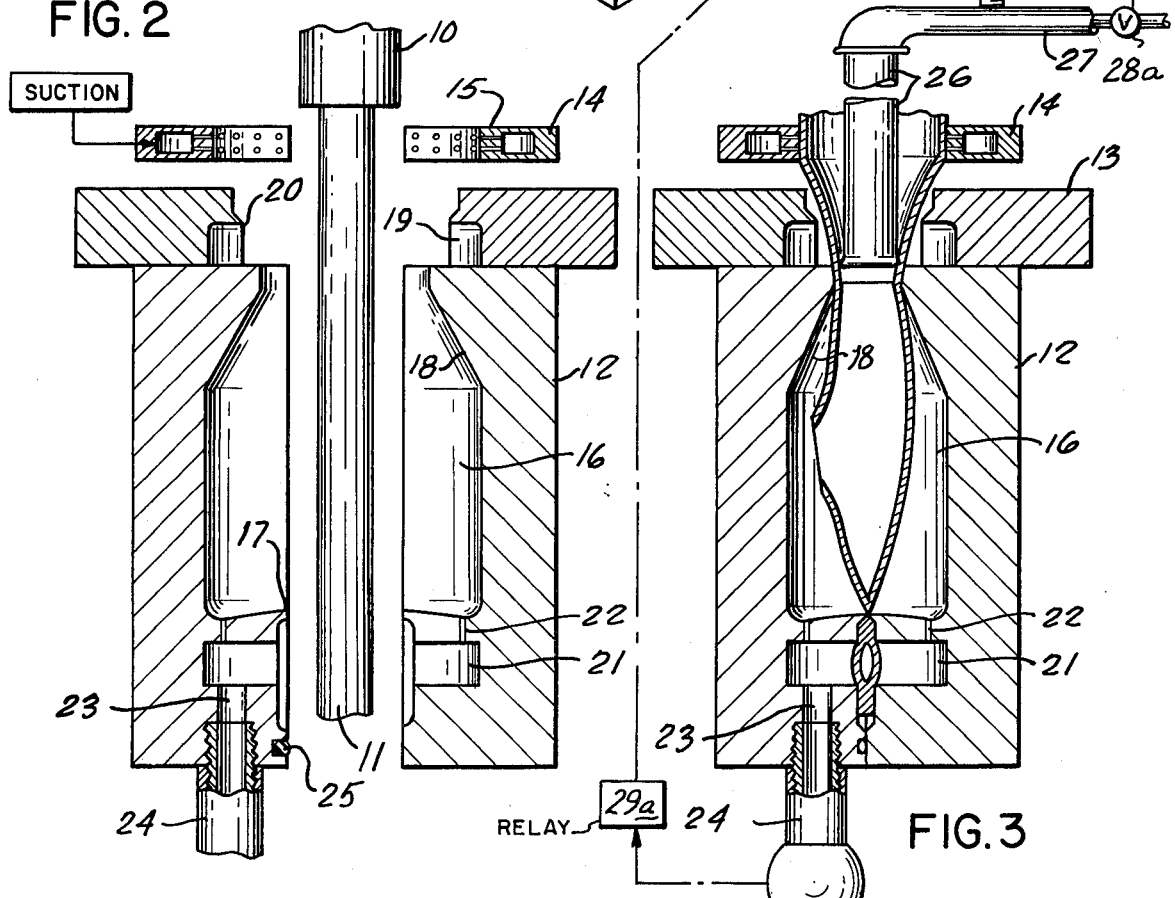

APPARATUS FOR PRODUCTION OF A BOTTLE-SHAPED CONTAINER, FILLED, SEALED AND READY FOR SHIPMENT

This is a division of application Ser. No. 409,714 filed Oct. 25, 1973, now U.S. Pat. No. 3,911,071.

The present invention relates to an apparatus for producing a bottle-shaped container, filled, sealed, and ready for shipment. The production method is as follows: A section of a thermoplastic synthetic tube or parison enters into a two-piece blow mold with individually movable crown halves. The bottom section of the parison is closed, the tube then is blown, filled, and sealed at the top. All this takes place with the parison still in the locked mold.

When producing such containers it is essential that this can be done continuously and rationally at a minimum of cost and material, as well as with an attractive design of the said containers.

Blowing and filling processes and devices are known where the containers are formed and sealed by means of a vacuum or superatmospheric pressure equipment. This process is rather complicated and necessitates a costly apparatus with specially formed, expensive crown forming devices. Furthermore, additional appliances for removing tube residues from the top and bottom of the blown containers is necessary for all known processes and devices.

The present invention has as its object the provision of a process and a device for an easy and low-cost production of containers ready for shipment.

According to the present invention the tube to be blown or parison is inserted into the mold and is formed by the pressure of either an agent or the filling material. The formed and filled container is hermetically sealed at the top by means of crown mold halves. Then a section of either the bottom or the wall of the container is forced to bulge into the container. The excess pressure thus created inside the completely closed container forces the wall of the container top into the crown mold halves while the synthetic material is still warm and workable.

With this process precise and clean crown forming of the container top is achieved in a simple way, without the use of complicated equipment. Moreover, production time is shorter due to the fact that process steps such as forming, filling and sealing can be sped up compared to the usual process by immediately creating excess pressure in the sealed container, which then expands from the bottom of the mold to the top. With this pressure the still warm and workable plastic tube is pressed into the top section of the mold, and the crown formed. After outer pressure eases, the excess pressure in the container drops, too, and the container shrinks back to blown size. The slight increase in volume caused in the container crown leads to a minimal subpressure which is counterbalanced by the material shrinkage following complete cooling-down.

The process corresponding to the present invention moreover allows a relatively simple removal of the tube press from the containers. By forcing the pressure agent between the mold and the container wall, this wall is pushed up from the press rigidly held between the mold halves.

The blow mold has at least one device, i.e. a pressure-medium passage in the bottom and/or wall section, directed against the wall of the container. This device must be operable when the mold is closed, and should make the wall bulge into the container.

A mechanical device can quickly push in the container bottom by moving a section of the mold bottom into the mold chamber.

According to a further development of the present invention the blow mold contains a pressure-medium distributing chamber under the mold bottom. A number of uniformly distributed passages lead into the mold. The distributing chamber is connected with a pressure developing unit by a tube. This pneumatic device is very simple.

These and other objects will become more readily apparent from the following detailed description, reference being made to accompanying drawing in which:

FIG. 1 is a perspective view of a tube extruder head with the blow mold in an open position;

FIG. 2 is a vertical section through the head of FIG. 1, increased in size;

FIG. 3 is a similar section through the blow mold equipment according to FIG. 2, in a second phase of operation with a closed mold, feed lines being shown for the pressurizing medium and filling matter;

Figure 4:
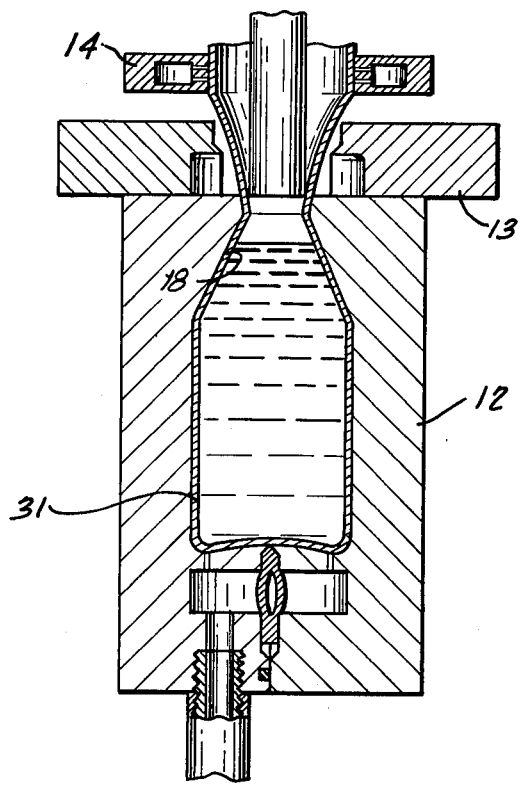
FIG. 4 is a another section through the blow mold equipment as in FIG. 3, in the third phase.
Figure 5:
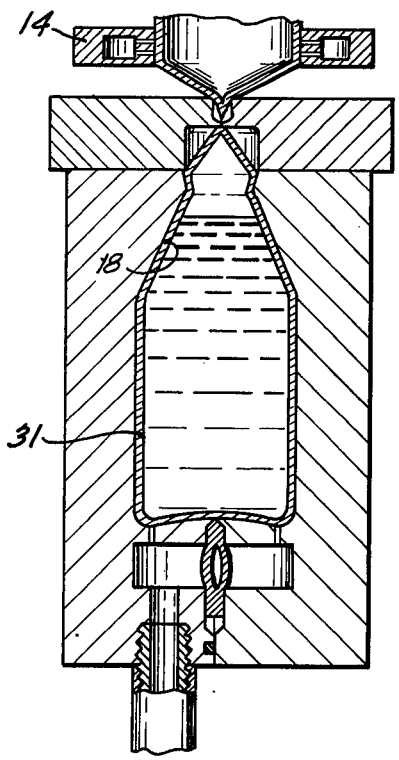
FIG. 5 is a section as in FIG. 4, in the fourth phase with crown mold closed.
Figure 6:
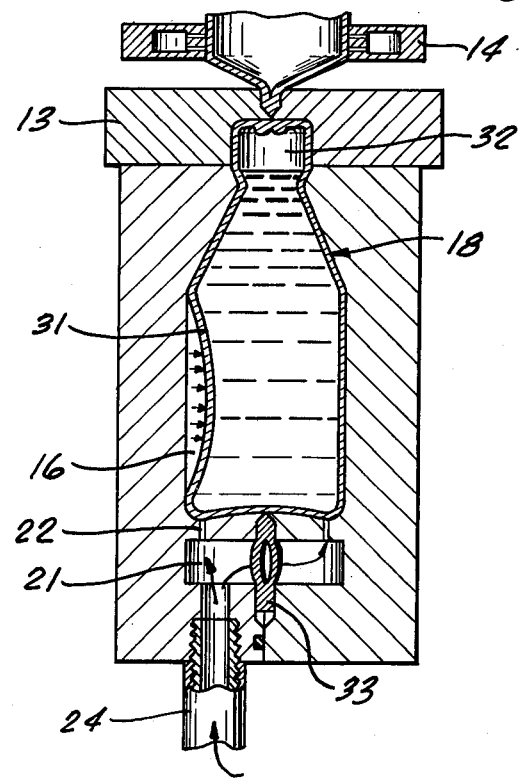
FIG. 6 is a section as in FIG. 5, in the fifth phase of operation.

As the blowing and filling device is already known, it is only partially shown in FIGS. 1 and 2. The head 10 of a tube extruder, also not in the drawing, is shown with a tube 11 or parison blown into the receiving section of the divided blow mold 12. The material, i.e. polyethylene, polyvinylchloride or similar synthetic material, is then still warm and workable. The crown mold halves 13 can be moved towards each other on the blow mold body. Two tube supporting segments 14 are situated above the crown mold halves 13. These segments can move towards each other, too. Upon closing of the mold they pick up the tube immediately after extrusion and keep it spread wide open by creating a vacuum in their vacuum channels 15 by connecting a suction source (not shown) thereto. An already known separating device (not shown) cuts off the tube above the supporting segments after they close in the tube.

The blow mold has a bottle-shaped chamber 16. When the mold is locked, this chamber is closed off at the bottom by tightly fitting mold borders 17, as shown in FIGS. 3 to 6. At the top the mold chamber has a narrowing, conical wall 18 forming the bottle neck. Then the wall widens to an opening, the border of which corresponds to the mold segment 19 of the crown mold 13 in closing position as in FIGS. 5 and 6. The mold segment forms a closing and separating edge 20 on the outside.

Under the mold chamber 16 in the blow mold 12 a fluid distributing chamber 21 is situated corresponding to the mold chamber in cross-section, and connected with it by a number of uniformly spaced agent channels 22. These channels form a circle along the bottom of the mold chamber, and enter into it in such a way that the agent used, i.e. preferably compressed air, can work on the bottom as well as the side wall of a container enclosed in the mold. The compressed air enters through bore 23 in the bottom section of the blow mold and a feed pipe 24 which is fixed in the bore and connected with a compressed-air source.

The blow mold halves 12 are tightly secured against air loss during pressure admission. In one of these halves a U-shaped groove runs from the top of the mold around the chamber 16 and the distributing chamber 21, and back into the top. From this groove an elastic tube-like packing 25 protrudes.

Blowing and filling of the tube section 11 are effected through opening 26. The pipe 27 is connected to the already mentioned pressure aggregate or source (not shown). A filling material line 28 runs concentric to this fluid pipe and also opens into the blowing and filling opening. Supply of the filling material is controlled by a known fill-up valve 28a which reacts to a predetermined control pulse.

The device mentioned above is suited for continuous blow-molding of special thin-walled containers and filling in of liquid products because it is possible to conduct a breaking test of the containers to be filled continuously even before the filling starts. This test is known for blow-molding and especially filling machines, and here it can be done with only a few more additional testing and control elements. In FIGS. 3 to 6 the operation shown is as follows. After locking of blow mold 12 and cut-off of inserted tube 11, opening 26 for blowing and filling in enters into the wide open top section. Its muzzle sits on the border of mold chamber 16 and closes this tightly, the tube wall lying inbetween. A blast of air from feed line 27 which is connected with the compressor causes the expansion of the tube section until it adheres to the wall of mold chamber 16.

In case of breaking of a wall 30, as shown in FIG. 3, the blast of air leaks out through the pressure agent distributor lines 21 to 24 in the bottom of the mold, hereby creating an excess pressure which triggers a relay 29a which keeps filling valve 29 shut. This is what happens when a relatively thin plastic tube of only limited workability is used, and, moreover, the tube section to be expanded is cracked.

But with a sound tube usually a tight container 31 is formed. Then the filling valve opens and the container is filled, as shown in FIG. 4. Then the crown mold halves 13 lock, and weld the tube top air-tight by the simple closing of the crown mold halves on the heated parison according to FIG. 5. The borders 20 of the crown mold halves are in the lateral contour of the container crown 32, and as they are equipped with a cutting edge, they separate the tube press from the container, while it is still held by the supports 14.

After that, compressed air is pressed into the mold chamber from under the container bottom by the agent feed lines 24, the distributing chamber 21, and the channels 22. By means of this pressure which starts at the container bottom, the container 31 is initially pressed against the conical mold chamber wall 18 with its neck, and then the most elastic parts of the container bottom and the remaining container body are forced to bulge into the container. This very short decrease in volume creates an excess pressure in the container, which propagates to the container top and forces its still warm and workable plastic wall into conformity with the crown mold cavity 19 formed by the mold halves 13.

The short blast in the distributing chamber 21 and under the container bottom 31 furthermore tears off the tube press 33 from the container.

After this blast the container returns to the blown size while keeping the crown formed. Material shrinkage of the container walls during cooling-off period counterbalances the subpressure created by the increase in volume in the container top, which also influences the contents of the container.

It is understood that the object of the invention is not limited to the device described, but can be further developed as to process and device, for example by using a different pressure agent and element, as well as applying compressed air for the separation of top tube press, as herein mentioned for the bottom tube press removal.

I claim:

1. An apparatus for producing a bottle-shaped container package, filled, sealed and ready for shipment, comprising:
   a blow mold formed with a pair of mold halves and defining a bottle-shaped mold cavity in a closed position of said mold halves, said cavity having a bottom and a neck;
   means for introducing a flexible-wall parison between said mold halves whereby closure of said mold halves encloses said parison in said mold cavity and seals said parison at said bottom of said cavity;
   means for blowing said parison through said neck with a blowing gas to expand said parison to the shape of said cavity thereby forming said parison into a bottle-shaped container in said cavity;
   a distribution chamber formed in said blow mold beneath said bottom;
   a plurality of channels formed in said blow mold and extending upwardly from said chamber to said bottom of said cavity and communicating between said chamber and said cavity;
   a hose connected to said distribution chamber for supplying a pressure medium thereto to cause said pressure medium to traverse said channels and enter said mold cavity between a wall of said mold cavity and a wall of said container, thereby deforming said wall of said container inwardly to express blowing gas from said container, said channels being distributed uniformly around said bottom of said mold cavity along the periphery thereof;
   means for filling said container through said neck with a liquid and pressing said wall of said container outwardly during the filling thereof; and
   means for sealing said container at said neck.

2. The apparatus defined in claim 1 wherein said bottom of said blow is formed with a pair of bottom-closing edges adapted to squeeze said parison between them and seal the bottom of said parison upon closure of the molded halves, said distribution chambers comprising a pair of compartments formed respectively in said mold halves and each extending along the entire length of the respective edge, said compartments joining together to constitute said chamber in said closed position of said mold halves.

* * * * *